(12) United States Patent
Gianone et al.

(10) Patent No.: US 7,592,802 B2
(45) Date of Patent: Sep. 22, 2009

(54) ANGLE OF ROTATION SENSOR

(75) Inventors: László Gianone, Budapest (HU);
Andrea Neumaier, Abensberg (DE);
István Zàdor, Ueroem (HU)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/104,792

(22) Filed: Apr. 17, 2008

(65) Prior Publication Data
US 2008/0290860 A1 Nov. 27, 2008

Related U.S. Application Data

(63) Continuation of application No. PCT/EP2006/009986, filed on Oct. 17, 2006.

(30) Foreign Application Priority Data
Oct. 17, 2005 (DE) .................. 10 2005 049 545

(51) Int. Cl.
G01B 7/30 (2006.01)
H01F 5/00 (2006.01)
(52) U.S. Cl. .................. 324/207.25; 324/207.15
(58) Field of Classification Search ............ 324/207.11, 324/207.13, 207.15, 207.16, 207.22, 207.25
See application file for complete search history.

(56) References Cited

U.S. PATENT DOCUMENTS 4,743,786 A * 5/1988 Ichikawa et al. ............ 310/111
5,523,679 A 6/1996 Kalb
5,825,176 A * 10/1998 Babin et al. ................ 324/174
5,867,022 A 2/1999 Eden et al.

FOREIGN PATENT DOCUMENTS

| DE | 1 272 567 | 7/1968 |
| DE | 28 36 000 | 3/1980 |
| DE | 42 33 549 A1 | 4/1994 |
| DE | 197 45 823 A1 | 4/1999 |
| EP | 0 797 078 A1 | 9/1997 |
| FR | 2 677 757 A1 | 12/1992 |

OTHER PUBLICATIONS

International Search Report dated Jan. 31, 2007 including an English translation (Four (4) pages).

* cited by examiner

Primary Examiner—Kenneth J Whittington
(74) Attorney, Agent, or Firm—Crowell & Moring LLP

(57) ABSTRACT

An angle of rotation sensor includes at least one coil provided with windings and a magnetically conductive element which interacts with the coil is rotatable with a shaft for transmitting a detectable rotational movement, and whose different overlap degree with at least one magnetically conductive body depends on the rotational position thereof. The magnetically conductive element is located outside of a space surrounded by the coil in each rotational position thereof and the magnetically conductive body is U-shaped in such a way that two legs thereof form an intermediate space therebetween and a perpendicular cross web connecting them. The magnetically conductive body includes shaft bearings mounted on the end areas of the legs.

7 Claims, 3 Drawing Sheets

ANGLE OF ROTATION SENSOR

CROSS-REFERENCE TO RELATED APPLICATIONS

This application is a continuation of PCT International Application No. PCT/EP2006/009986, filed on Oct. 17, 2006, which claims priority under 35 U.S.C. §119 to German Application No. 10 2005 049 545.1, filed Oct. 17, 2005, the entire disclosures of which are expressly incorporated by reference herein.

BACKGROUND AND SUMMARY OF THE INVENTION

The invention is based on a rotation angle sensor having at least one coil, which is provided with windings, as well as an element which interacts with the coil, is magnetically conductive, and can rotate with a shaft for transmission of the sensed rotary movement.

EP 0 797 078 A1 discloses a rotation angle sensor in which the coil is wound on a coil former, which is in the form of a box and is composed of a non-magnetically permeable material whose side openings are partially covered by sheets composed of magnetically conductive material. The rotatable element is attached as a flag to the shaft and is mounted completely within the coil former in every rotation position. The rotatable element covers or overlaps the side sheets differently, depending on the rotation position. The linear response of the rotation angle sensor is then achieved by the essentially linear relationship of the coverage or overlap area, which is formed between the rotatable element and the sheets. The angular position of the rotatable element is changed by rotation of the shaft, and its coverage area of the sheets is therefore also changed, resulting in a measurable change in the magnetic reluctance of the magnetic circuit, and therefore in the inductance.

Rotation angle sensors of the above generic type are known from DE 42 33 549 A1 and DE 197 45 823 A1.

In contrast, the present invention is based on the object of further developing a rotation angle sensor so as to ensure greater accuracy and better resolution.

According to the invention, this object is achieved by having at least one coil, which is provided with windings, as well as an element which interacts with the coil, is magnetically conductive, and can rotate with a shaft for transmission of the sensed rotary movement. The magnetically conductive element has a different coverage or overlap degree with at least one magnetically conductive body depending on its rotational position. The magnetically conductive element is always arranged outside an area that is surrounded by the coil in every rotation position. The magnetically conductive body is U-shaped, having two limbs which form an intermediate space between them, and with a lateral web connecting them. The magnetically conductive body has bearing points for the shaft formed in an end area of its limbs.

Since the magnetically conductive element is always arranged outside an area surrounded by the coil in every rotation position, it never enters the area surrounded by the coil in any rotation position. Experiments carried out by the applicant have shown that the range of self-inductance of the coil is then advantageously wide. This results in the advantage that the rotation angle sensor is highly accurate and has high resolution.

In this case, the magnetically conductive body is U-shaped, with two limbs which form an intermediate space therebetween, and a lateral web which connects them. The expression "U-shaped" should be understood in its broadest sense, and is also intended to cover all those bodies which have a structure with at least one opening into which the magnetically conductive element can project, that is to say, for example, it also includes C-shaped cross sections. This then allows the magnetically conductive element to project into the intermediate space with a different coverage degree over the limbs, depending on its rotation position.

In the end region of its limbs, the magnetically conductive body has bearing points for the shaft, with the shaft preferably being arranged at right angles to the limbs.

The bearing points for the shaft are, preferably, formed as holes in the limbs.

According to one preferred embodiment, the coil surrounds at least one limb and/or the lateral web of the magnetically conductive body. In this case, the coil can be wound directly on the magnetically conductive body or on a coil former composed of a material that is not magnetically conductive, and is supported by the body.

Other objects, advantages and novel features of the present invention will become apparent from the following detailed description when considered in conjunction with the accompanying drawings.

DETAILED DESCRIPTION OF THE DRAWINGS

Figure 1:
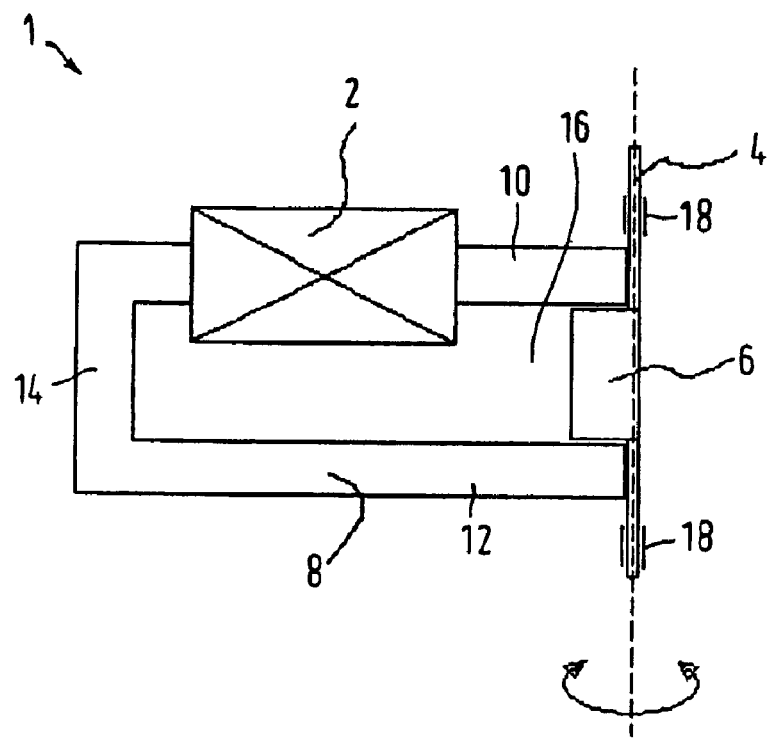
FIG. 1 is a schematic side view of a rotation angle sensor according to one preferred embodiment of the invention.

For purpose of explanation, the invention will be described with reference to FIG. 1, which shows a rotation angle sensor 1 according to one preferred embodiment. The rotation angle sensor 1 is used to convert a mechanical rotary movement into an electrical signal, which electrical signal is proportional to the rotation angle, for the purposes of a non-contacting measurement process.

For this purpose, the rotation angle sensor 1 contains a coil 2, which is provided with electrically conductive windings, as well as a magnetically conductive element 6, which interacts with the coil and can rotate about a shaft 4 in order to transmit the rotary movement to be sensed. In this case, the coil 2 at least partially surrounds a magnetically conductive body 8, which is, preferably, essentially U-shaped, having two limbs 10, 12 and a lateral web 14 connecting them. The expression magnetically conductive or permeable material is intended to mean a ferromagnetic or soft-magnetic material.

The shaft 4 is arranged, and the magnetically conductive material 6 is formed, such that the magnetically conductive element 6 can project into an intermediate space 16 formed between the limbs 10, 12. As such, the element 6 has a different coverage area or degree of overlap 7 with respect to the limbs 10, 12, depending on its rotational position.

In FIG. 1, the magnetically conductive element 6 is always located outside the area surrounded by the coil 2, and is arranged at least at a short distance therefrom, at every rotational position. In fact, one limb 10 of the magnetically conductive body 8 projects through the area surrounded by the coil 2.

To be more precise, the shaft 4, to which the magnetically conductive element 6 is fitted, is arranged at right angles to the limbs 10, 12 of the magnetically conductive body 8, and is located immediately opposite end surfaces of the ends of the limbs 10, 12. The shaft 4 itself can then be mounted on external bearings 18 such that it can rotate. The magnetically conductive element 6 is, preferably, in the form of a sector of a circular cylinder, particularly preferably in the form of a half-cylinder, which is attached like a flag to the shaft 4. As can best be seen from FIG. 2, the coverage area 7, seen in the direction of the shaft 4, is then between the element 6 and the limbs 10, 12 depending on the respective rotation position of the element 6. Alternatively, the magnetically conductive material of the element 6 may also be supported by a mount body, which is attached to the shaft 4 and is composed of material which is not magnetically permeable, but which can then provide better dimensional stability to the magnetically conductive material.

In order to achieve an inductance value range that is as wide as possible, it is advantageous for the coverage area 7 to be as small as possible, or for there to be no coverage whatsoever, in at least one angular position of the magnetically conductive element 6. The latter is possible when, as in the case of the preferred exemplary embodiment shown in FIG. 1, the opening angle of the cylinder sector is less than or equal to 180 degrees, preferably 180 degrees, and the shaft is arranged outside the intermediate space 16 covered by the limbs 10, 12.

As already mentioned above, the coil 2 surrounds, for example, at least one part of a limb 10 of the magnetically conductive body 8. In this case, the coil 2 may be wound directly on the limb 10 or on a coil former which is composed of a material that is not magnetically permeable, for example, plastic. This coil former is then, in turn, supported by the limb 10 of the magnetically conductive body 8.

Figure 2:
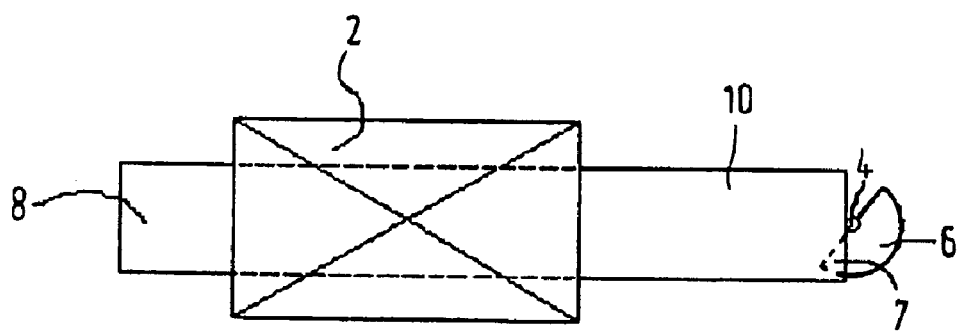
FIG. 2 is a plan view of the rotation angle sensor shown in FIG. 1.
Figure 3:
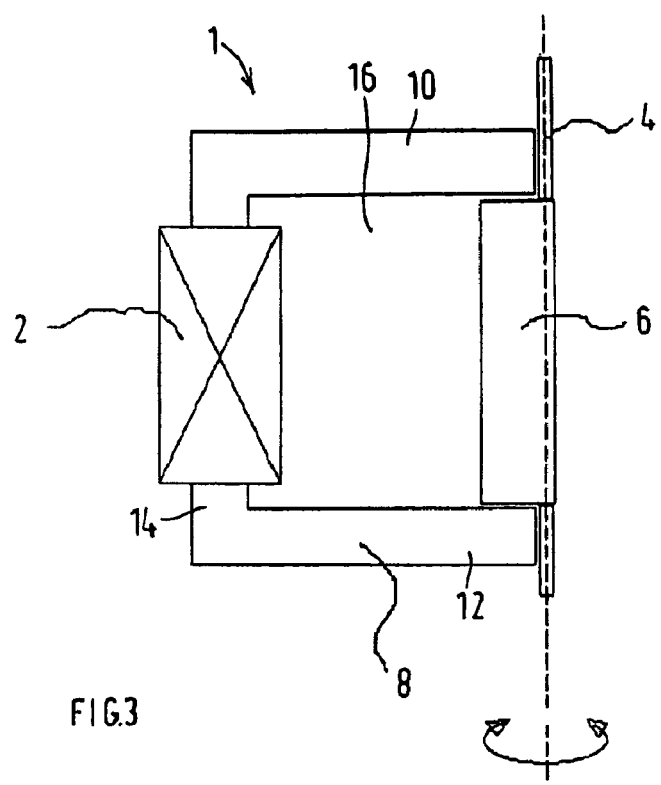
FIG. 3 is a schematic side view of a rotation angle sensor according to a further embodiment of the invention.

According to a further embodiment illustrated in FIG. 3, the coil 2 is wound around the lateral web 14 of the magnetically conductive body 8. Otherwise, the design configuration of FIG. 2 is the same as that for the embodiment in FIG. 1. The coil 2 may, however, also loop around both limbs 10, 12 and the lateral web 14, depending on the requirements. Not least, the limb 10 or the limbs 10, 12 and/or the lateral web 14 may be fitted with not just one, but with a plurality of coils 2.

Figure 4:
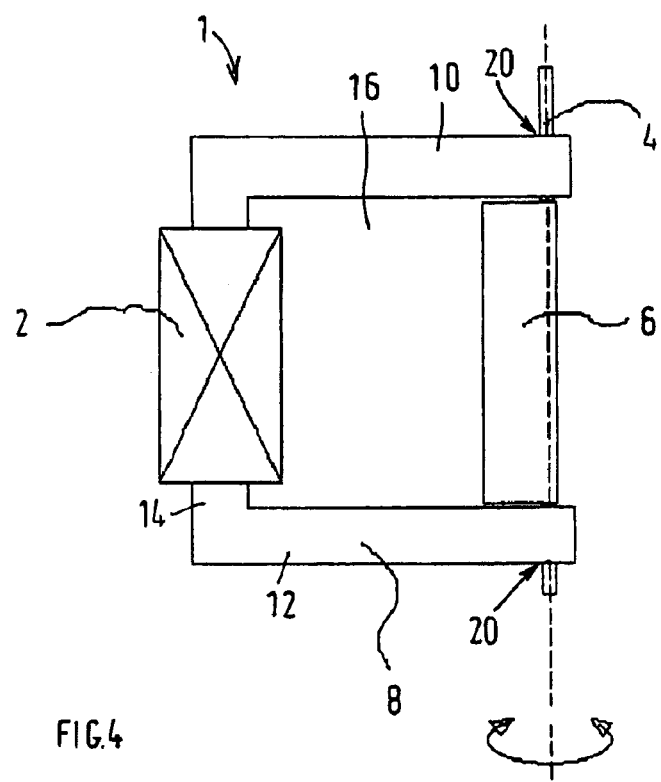
FIG. 4 is a schematic side view of a rotation angle sensor according to a still further embodiment of the invention.

Furthermore, according to the embodiment shown in FIG. 4, the limbs 10, 12 may have bearing points 20 for the shaft 4 in their end areas, for example in the form of apertures or holes, through which the shaft 4 projects.

Figure 5:
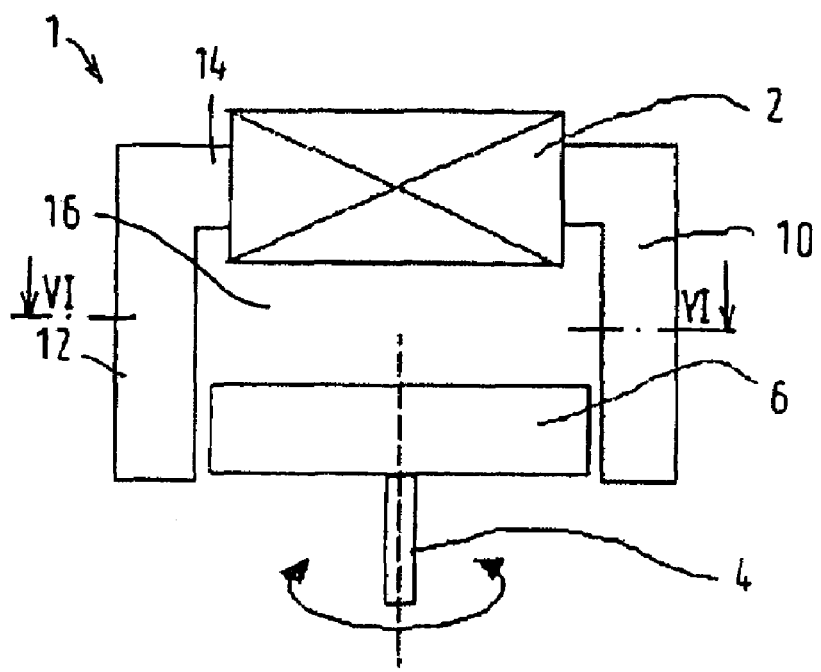
FIG. 5 is a schematic side view of a rotation angle sensor according to a yet another embodiment of the invention.
Figure 6:
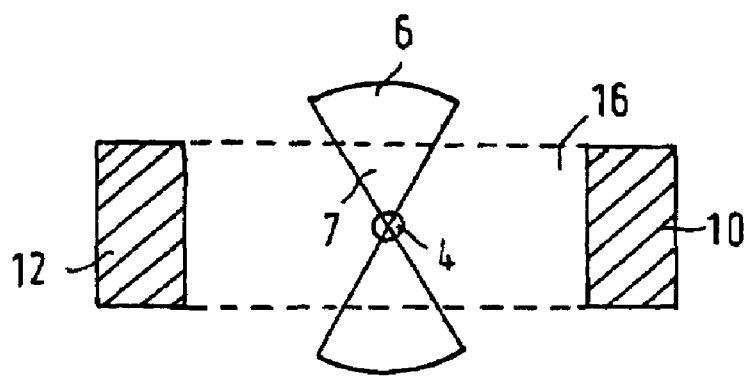
FIG. 6 is a sectional illustration taken along line VI-VI of FIG. 5.

According to a further embodiment, which is illustrated in FIG. 5 and FIG. 6, the shaft 4 may also be arranged parallel to the limbs 10, 12, preferably centrally between them, and the coverage area 7, which is dependent on the rotational position, between the element 6 and the limbs 10, 12 may result from the element 6 having, for example, a circular cross section, provided with radial cutouts, seen on a plane at right angles to the shaft 4, with a diameter or a radial extent which may project beyond the width of the limbs 10, 12 in specific rotational positions. The element 6 may, therefore, have any desired shape, for example even being in the form of a bar, the critical factor being that its coverage area 7 with the intermediate space 16 that is formed between the limbs 10, 12 is dependent on the rotational position. Furthermore, in this exemplary embodiment as well, the magnetically conductive element 6 is always arranged outside the area surrounded by the coil 2, in every rotational position, with the coil 2 being wound, for example, around the lateral web 14.

Against this background, the method of operation of the rotation angle sensor 1 according to the invention is as follows: the angular position of the magnetically conductive element 6, and therefore its coverage area 7 with respect to the likewise magnetically conductive limbs 10, 12 as well, are changed as a result of the shaft rotation to be sensed in any given direction. This change in the coverage area 7 changes the self-inductance of the coil 2, and this is used to obtain an electrical signal.

By way of example, the coil 2 is excited by a microprocessor, which feeds square-wave pulses into the coil 2. The self-inductance of the coil 2 can then be determined from the duration of the decay of the pulse to a lower limit. In this case, the rotation angle acting on the shaft 4 is determined by means of a time measurement. Alternatively, the coil 2 or the coils can also, of course, be excited by a sinusoidal AC voltage.

TABLE OF REFERENCE SYMBOLS

1 Rotation angle sensor
2 Coil
4 Shaft
6 Element
7 Coverage area
8 Body
10 Limb
12 Limb
14 Lateral web
16 Intermediate space
18 Bearing
20 Bearing The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotation angle sensor, comprising:
   at least one coil provided with windings;
   a rotatable shaft;
   a magnetically conductive element interacting with the coil and being rotatable with the shaft for transmitting a detectable rotational movement;
   a magnetically conductive U-shaped body including two limbs forming an intermediate space therebetween, a lateral web connecting the two limbs, and free end areas of the two limbs opposite the lateral web;
   wherein the magnetically conductive element overlaps the magnetically conductive body to a different degree depending upon a rotational position thereof;
   wherein the magnetically conductive element is located outside of a space surrounded by the coil in each rotational position thereof; and
   wherein the magnetically conductive body includes bearing points for the shaft formed in said free end areas of the two limbs.

2. The rotational angle sensor according to claim 1, wherein the magnetically conductive body is at least one of integrally formed or formed of a plurality of pieces.

3. The rotational angle sensor according to claim 2, wherein the shaft is arranged at right angles to the limbs of the U-shaped magnetically conductive body.

4. The rotational angle sensor according to claim 1, wherein the at least one coil surrounds at least one of the limbs and/or the lateral web of the magnetically conductive body.

5. The rotational angle sensor according to claim 1, wherein the coil is wound directly on the magnetically conductive body.

6. The rotational angle sensor according to claim 1, wherein the coil is wound on a coil former comprising a material that is not magnetically permeable and is supported by the magnetically conductive body.

7. A rotational angle sensor, comprising:
at least one coil provided with windings;
a rotatable shaft;
a magnetically conductive element interacting with the coil and being rotatable with the shaft for transmitting a detectable rotational movement; and
a magnetically conductive U-shaped body including two limbs forming an intermediate space therebetween and a lateral web connecting the two limbs;
wherein the magnetically conductive element overlaps the magnetically conductive body to a different degree depending upon a rotational position thereof;
wherein the magnetically conductive element is located outside of a space surrounded by the coil in each rotational position thereof;
wherein the magnetically conductive body includes bearing points for the shaft formed in free end areas of the two limbs; and
wherein the bearing points formed in the free end areas of the limbs comprise holes arranged in the limbs.

* * * * *